INVENTOR.
HIRAM E. TEMPLE

INVENTOR.
HIRAM E. TEMPLE

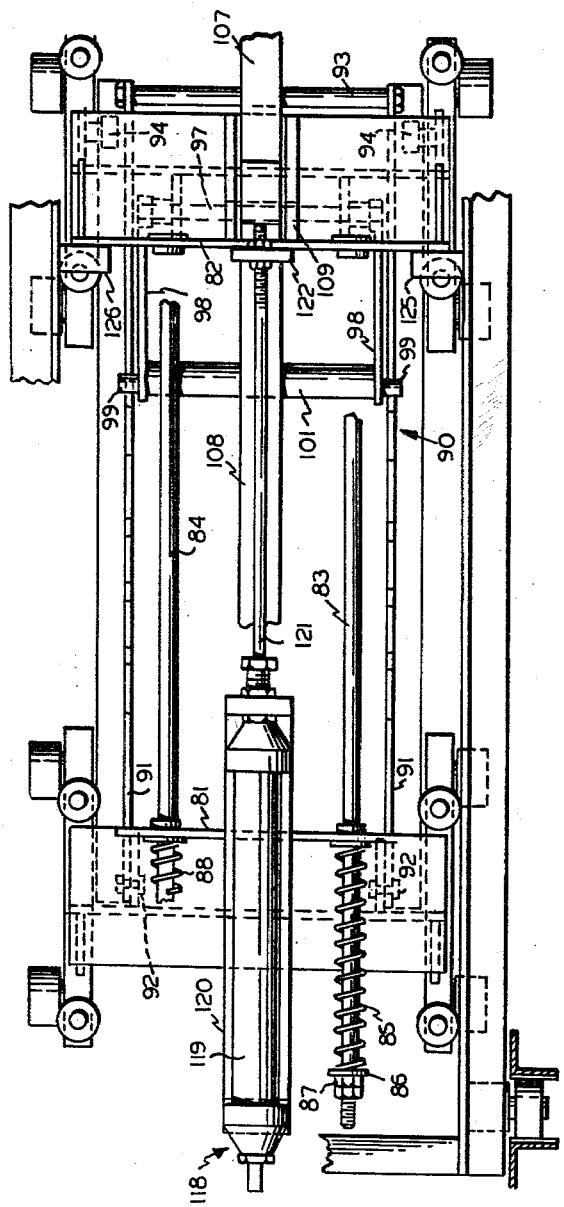

United States Patent Office 3,176,874
Patented Apr. 6, 1965

3,176,874
PAN UNSTACKING APPARATUS
Hiram E. Temple, Saginaw, Mich., assignor to Baker Perkins Inc., Saginaw, Mich., a corporation of New York
Filed July 16, 1962, Ser. No. 209,910
19 Claims. (Cl. 221—210)

This invention relates to apparatus for successively removing the uppermost pan from a stack of pans and transporting the removed pans away from the zone of the stack.

Commercial bakeries conventionally store unused pans in stacks of fifty or more. To promote the stacking of such pans and to maintain the overall height of a stack as low as possible, the pans are nestable. To unstack nested pans, it is necessary that the uppermost pan of the stack be lifted vertically prior to its being transferred laterally in order that the bottom of the uppermost pan may clear the top of the next lower pan. The necessity of having to lift the uppermost pan prior to transferring it laterally heretofore has resulted in the use by some manufacturers of multiple driving mechanisms and complex timing and sequencing devices. The use of such mechanisms and devices not only is expensive but also usually necessitates some supervision of the unstacking operation and frequent servicing.

An object of this invention is to provide pan unstacking and transfer apparatus which effects both unstacking and transfer of pans by a single driving mechanism.

Another object of the invention is to provide pan unstacking apparatus having pan clamping means that is operable automatically to clamp and unclamp a pan, thereby eliminating the need for sequencing devices.

A further object of the invention is to provide a pan clamping means in unstacking and transfer apparatus of the kind described and wherein the clamping and unclamping of a pan are effected by self-contained means operable automatically in response to an unstacking and transferring cycle of the apparatus.

Another object of the invention is to provide adjustable pan unstacking and transfer apparatus so as to permit the apparatus to be usable with pans of different size.

A further object of the invention is to provide simplified unstacking apparatus of the kind referred to and composed primarily of mechanical elements, thereby simplifying servicing of the apparatus.

Other objects and advantages of the invention will be pointed out specifically or will become apparent from the following description when it is considered in conjunction with the appended claims and the accompanying drawings, in which:

FIGURE 5 is a fragmentary, top plan view, partly in section, of the apparatus shown in FIGURE 4 and illustrating the latching and unlatching mechanism of the pan clamping means.

Figure 1:
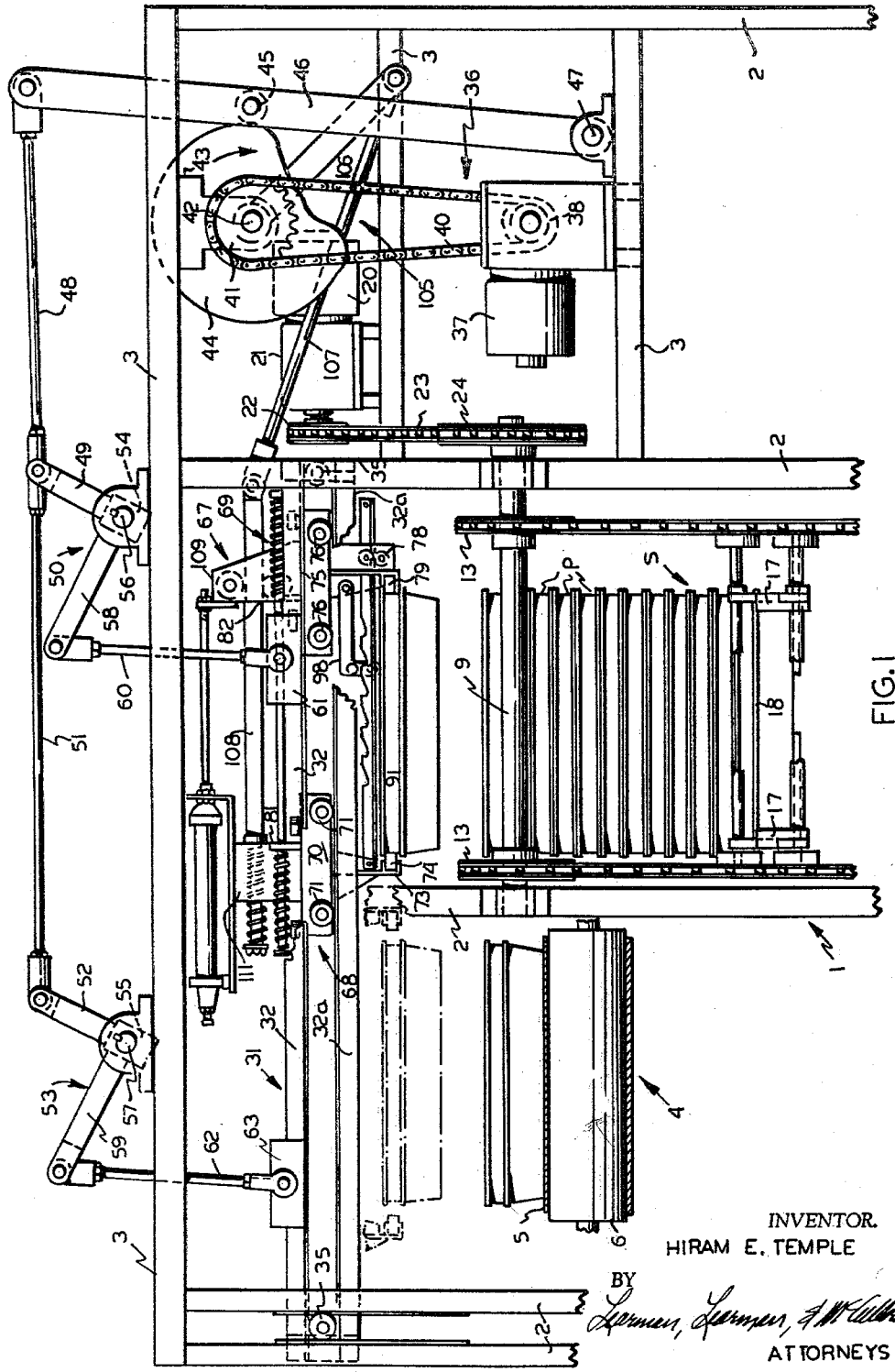
FIGURE 1 is a fragmentary, side elevational view of apparatus constructed in accordance with the invention, certain parts being broken away for purposes of illustration.

Apparatus constructed in accordance with the invention comprises a main frame 1 composed of a plurality of vertical and horizontal frame members 2 and 3, respectively, that may be welded or otherwise suitably connected one to another so as to form a rigid construction. It will be understood that the frame ordinarily will be enclosed within suitable side and end panel members, but such panel members are not shown in the drawings.

The frame 1 is adapted to be arranged in overhanging or straddling relation with a pan discharge conveyor 4 which may include an endless belt or the like 5 trained around driven rolls 6 in the conventional manner. As is shown in FIGURE 3, the frame also may straddle a similar power driven conveyor 7 that may be utilized to deliver a stack S of pans P to a stack elevator 8.

Figure 3:
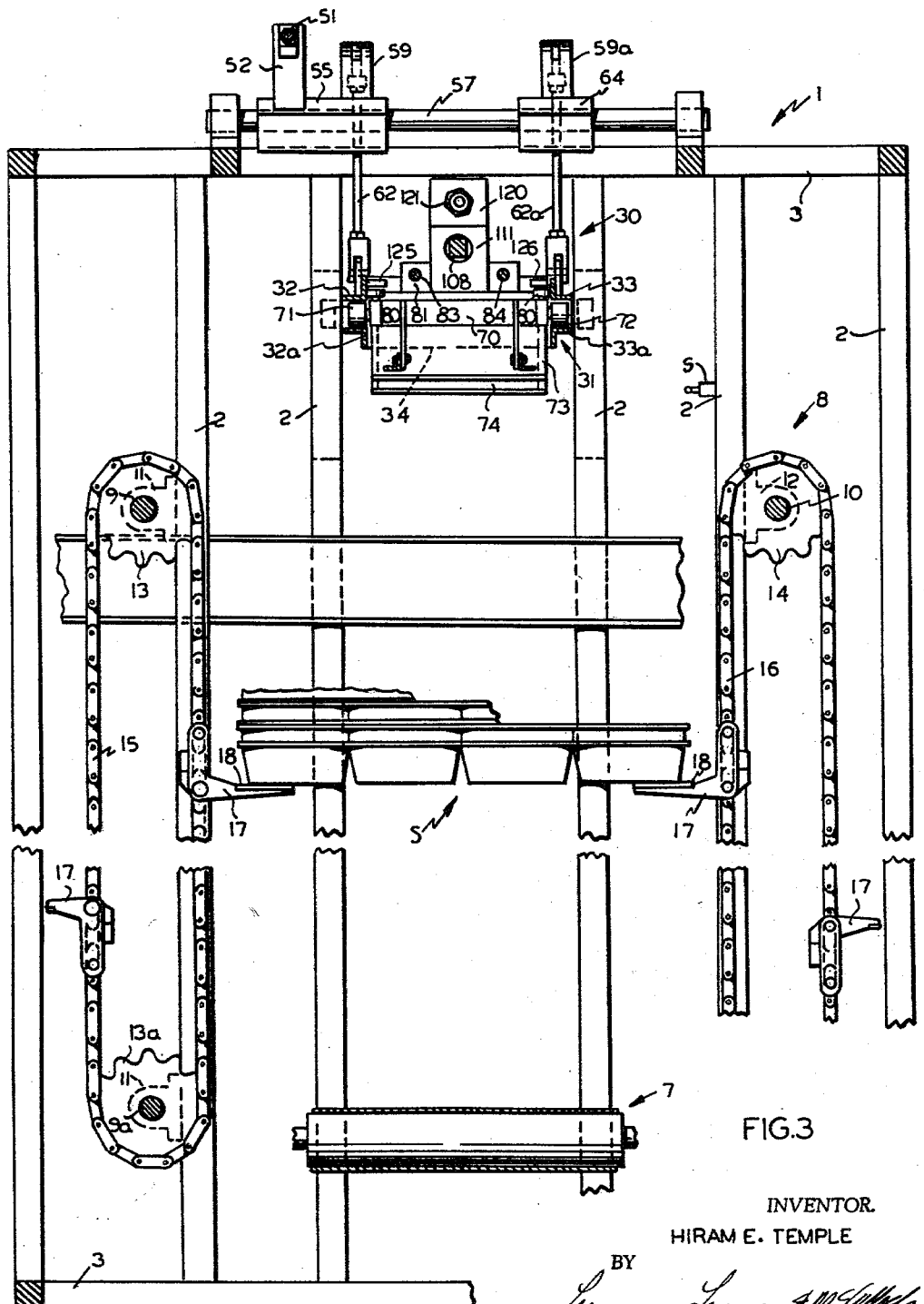
FIGURE 3 is a sectional view taken on the line 3—3 of FIGURE 2.

The pan stack elevator 8 comprises two upper shafts 9 and 10 journaled in suitable bearing supports 11 and 12, respectively, that are supported on spaced apart frame members 2, and two companion lower shafts, one of which is shown at 9a in FIGURE 3, and journaled in similar bearing supports mounted on the same vertical frame members. Fixed adjacent opposite ends of the shaft 9 is a pair of sprocket wheels 13, and similar sprocket wheels 14 are fixed adjacent opposite ends of the shaft 10. Companion sprocket wheels 13a are fixed adjacent opposite ends of the shafts 9a. Around each set of sprocket wheels 13, 13a is trained a sprocket chain 15, and a similar sprocket chain 16 is trained around each set of sprocket wheels 14 and the companion lower sprocket wheels. Between each set of sprocket chains is mounted a pair of lugs 17 and between the lugs on adjacent sets of chains extends a pan supporting plate 18.

As is best illustrated in FIGURE 3, the lugs 17 and the plates 18 on the inner runs of the chains 15 and 16 extend toward one another a distance sufficient to provide supports for a stack of pans P. Driving of the chains 15 and 16 in such directions as to cause the respective supporting members 18 to move upwardly will elevate the stack of pans.

Means for driving the stack elevator 8 comprises an electric motor 20 (FIGURES 1 and 2) having its armature shaft keyed to the driving shaft of a speed reduction unit 21 of known construction. The driven shaft of the speed reduction unit is keyed to a sprocket wheel 22 around which is trained a sprocket chain 23. The chain 23 also is trained around a sprocket wheel 24a that is fixed to an extension 9b on the shaft 9a so as to drive the latter in a counterclockwise direction, as is viewed in FIGURE 3. Also mounted on the shaft 9a is a gear 25 in mesh with a similar gear 26 that is fast on a stub shaft 27 which is journaled in an adjacent frame member 2. Fast on the shaft 27 is a sprocket wheel 28 around which is trained a sprocket chain 29. The chain 29 also is trained around a sprocket wheel 24 that is fixed to an extension 9c of the shaft 9 so as to rotate the shaft 9 in a clockwise direction, as is viewed in FIGURE 3.

The pan elevating apparatus 8 operates in such manner as to lift a stack of pans off the conveyor 7 and move the stack upwardly until the uppermost pan P reaches a predetermined level. This level may be determined in any number of conventional ways, such as by the presence of a normally closed switch S (FIGURE 3) in circuit with the motor 20 and located to be engaged by the uppermost pan when its upper edge reaches the desired level. Engagement between the uppermost pan and the switch may open the latter to interrupt operation of the motor 20 until the uppermost pan is removed from the stack and moved out of engagement with the switch. Thereafter, the switch automatically will close and reenergize the motor 20 to index the stack upwardly in increments of height corresponding substantially to the depth of a pan. Alternatively, the operation of the pan elevating mechanism could be controlled by a photoelectric cell circuit or in any other conventional manner.

Pan unstacking and transfer mechanism constructed according to the invention is designated generally by the reference character 30 and comprises a generally rectangular carriage frame 31 composed of a pair of parallel, vertically spaced angle members 32, 32a at one side and a similar pair of angle members 33, 33a at the other side. At the ends of the angle members are transverse frame members 34 and to which the respective angle members are welded or otherwise suitably fixed to form a rigid structure. The carriage frame 31 is adapted to be reciprocated vertically and includes rollers 35 at each end thereof which track in guides located on selected frame members 2.

Driving means 36 is provided to reciprocate the carriage frame 31 and comprises an electric motor 37 that drives a sprocket wheel 38 through a speed reduction unit 39 of known construction. A chain 40 is trained around the sprocket wheel 38 and around a sprocket wheel 41 that is fixed on a shaft 42 which is journaled in bearings 43 that are supported from selected frame members 3. Also fixed on the shaft 42 is a cam 44, and bearing against the periphery of the cam is a follower roller 45 that is rotatably journaled on a lever 46 which is pivotally mounted as at 47 at its lower end on a frame member 3. The upper end of the lever 46 is pivoted to one end of a link 48, the opposite end of which is pivoted to one arm 49 of a bell crank 50. To this end of the link 48 also is pivoted one end of an extension link 51, the other end of which is pivoted to one arm 52 of a second bell crank lever 53. The arm 49 forms an integral part of a sleeve 54 and the arm 52 forms an integral part of a similar sleeve 55. The sleeve 54 receives and is keyed to a shaft 56 that is journaled at its ends in bearings supported by two of the frame members 3, and the sleeve 55 receives and is keyed to a similar shaft 57 which is similarly journaled.

The bell crank 50 includes a second arm 58 (FIGURES 1 and 2) forming an integral part of the sleeve 54, and the bell crank 53 includes a similar arm 59. To the free end of the arm 58 is pivoted one end of a suspension link 60, the other end of which is pivoted to a block 61 that is fixed to the carriage frame 31. A similar suspension link 62 is pivoted at one end to the free end of the bell crank arm 59 and at its other end to a block 63 that is secured to the carriage frame 31. As is best shown in FIGURES 2 and 3, the shaft 57 extends through a sleeve 64 that is keyed to the shaft and which includes an integral arm 59a, similar to the arm 59, and which is pivotally connected to a similar suspension link 62a. The shaft 56 is provided with a similar sleeve 65 having an integral arm 49a similar to the arm 49 and pivoted to a suspension link 60a that is similar in all respects to the link 60.

Figure 2:
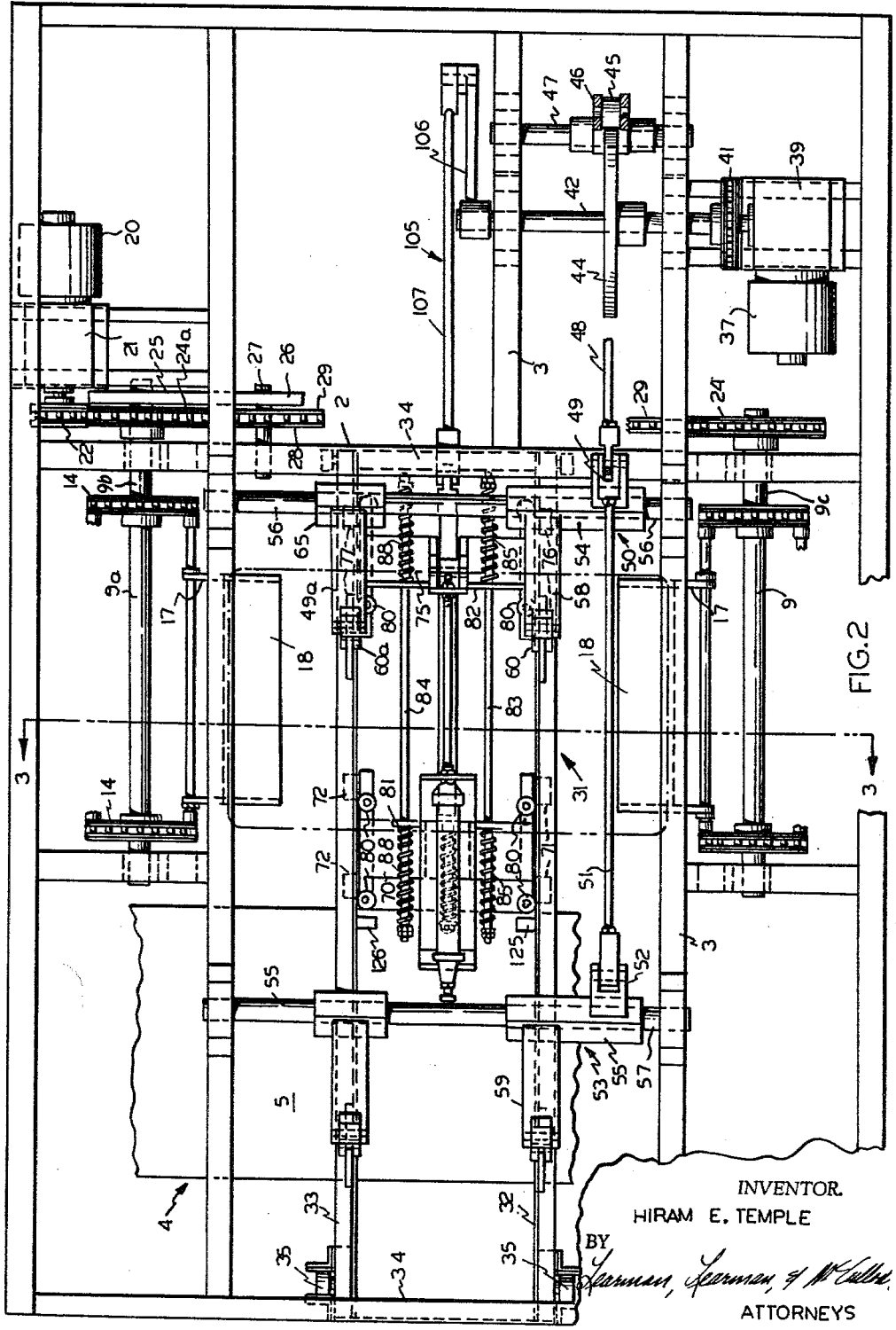
FIGURE 2 is a fragmentary, top plan view of the apparatus shown in FIGURE 1, the latching and unlatching mechanism for the pan clamping means being omitted for clarity.

The construction and arrangement of the carriage supporting driving mechanism described thus far are such that the carriage frame 31 is suspended from the suspension links so that the weight of the carriage frame constantly exerts a force on the bell cranks 50 and 53, tending to rock them counterclockwise, as viewed in FIGURE 1. The tendency of the bell cranks to rock counterclockwise maintains the cam follower 45 in constant engagement with the peripheral surface of the cam 44 so that rotation of the latter by the motor 37 will effect cyclical, vertical reciprocating movements of the carriage frame 31. The surface of the cam 44 is so contoured that, for a majority of the rotation of the cam, the carriage frame 31 is maintained in its elevated position, shown in FIGURE 1, for a purpose presently to be explained.

The invention includes pan clamping and transfer apparatus 67 having independently movable first and second carriages 68 and 69, respectively. The first carriage 68 comprises a base plate 70 spanning the carriage frame 31 and having rollers 71 and 72 at its opposite ends which ride upon the frame members 32a and 33a, respectively. Rigidly fixed to and depending from the base plate 70 is a clamp or gripper member 73 having a rubber or other resilient pad 74 supported at its lower end. The carriage 69 includes a similar base plate 75 having similar rollers 76 and 77 which also ride upon the respective frame members 32a and 33a. Rigidly fixed to and depending from the base plate 75 is a clamp or gripper member 78 having a similar pad 79 supported thereon. The members 68 and 69 are relatively movable toward and away from one another and to prevent canting of the members they may be provided with stabilizing rollers 80 which bear against the inner surfaces of the frame members 32 and 33.

Figure 4:
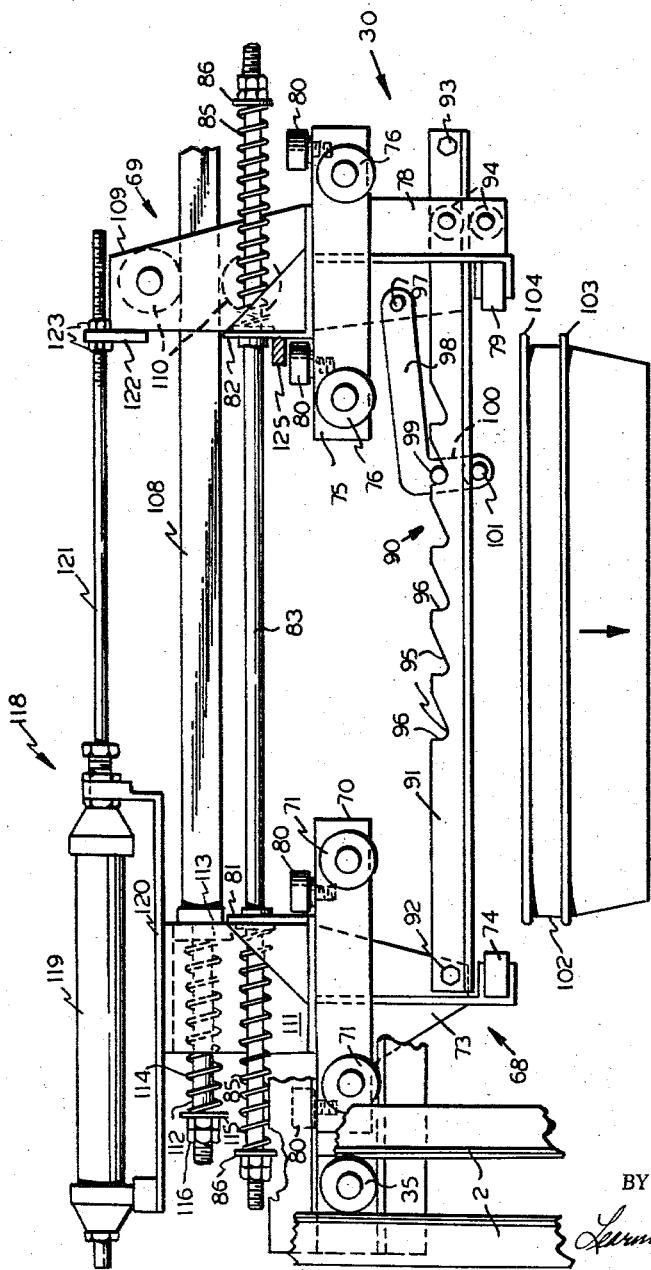
FIGURE 4 is an enlarged, side elevational view of the pan clamping and unclamping mechanism.

Rigidly fixed to the base 70 of the carriage member 68 is an upstanding plate or flange 81, and a similar plate or flange 82 is rigidly fixed to the base 75 of the member 69. A pair of rods 83 and 84 slideably pass through both of the plates 81 and 82 and, as is best shown in FIGURES 2 and 4, the rods project a substantial distance beyond each of the plates 81 and 82. At each end of the rod 83 is a biasing spring 85 which reacts between the associated plate 81 and a washer 86 which is adjustably supported on the rod by nuts 87. A similar spring 88 is similarly mounted at each end of the rod 84 and reacts in like manner between its associated plate 81 or 82 and similar washers and nuts.

Inasmuch as the carriage members 68 and 69 are capable of relative movement toward and away from one another, the springs 85 and 88 are so arranged as to bias the carriage members to move toward one another. The distance that the carriage members 68 and 69 are free to move toward one another should be such that the distance between the gripper members is less than the distance between the opposed end walls of the pans P, thereby assuring clamping of a pan between the members 73 and 78. However, in order to permit a pan to be received between the clamp members, it is necessary that the latter be capable of being held apart a distance greater than the distance between the end walls of the pan. Accordingly, releasable latch means 90 is provided and which is operable normally to maintain the clamp members in a position in which the distance between them is different than the distance between the opposed end walls of the pan P.

The latch means 90 comprises a pair of latch bars 91 that are fixed at corresponding ends by bolts 92 to the clamp member 73. The opposite ends of the latch bars 91 are connected to one another by a bolt 93 and are slideably supported on the clamp member 78 between rollers 94. The upper surface of each latch bar 91 is provided with a plurality of notches 95, each of which has an abrupt wall at the end thereof that is closer to the clamp member 73 than to the clamp member 78. Pivoted as at 97 to the clamp member 78 is a pair of arms 98. At the free end of each arm 98 is a laterally projecting latch bolt or stud 99 which is adapted to seat in any selected one of the notches 95 of the associated latch bar 91.

The latch arms 98 are freely pivotable about the axis of the pin 97 so that they normally tend to swing downwardly to effect engagement between the studs 99 and the latch bars 91. Thus, the latch mechanism is normally urged by gravity toward its latching position.

Latch releasing means is provided to release the latching mechanism and comprises a downwardly projecting extension 100 on each of the arms 98 and between which extends a bar or roller 101 that projects below the level of the latch bars 91 when the latching mechanism is in its latched position. The construction and arrangement of the latch mechanism are such that relative vertical movement of the carriage members 68 and 69 and the stack of pans P will cause the upper edge of the uppermost pan P to engage the latch releasing bar 101 and displace it upwardly so as to remove the latch studs 99 from the associated notches 95. Removal of the latch studs from the notches will enable the biasing springs 85 and 88 to effect relative movement of the carriage members 68 and 69 toward one another and thereby effect clamping engagement between the clamp members and the opposite end walls of the uppermost pan P.

It is common in commercial bakeries to strap several individual pans to one another to provide a set of pans. The strap usually is located at the upper edge of the several pans and such a strap is shown in the drawings at 102. Preferably, the strap has a lower bead 103 which determines the extent to which an upper pan may be received within a lower pan. The strap 102 also preferably includes an upper bead 104 which facilitates gripping of the pan by the several kinds of pan handling devices in such bakeries. Apparatus constructed in accordance with the invention is adapted for use with individual pans or pan sets.

In the preferred embodiment of the invention, the clamp members 73 and 78 are adapted to grip the external walls of a pan. Consequently, it is preferable that the relative vertical movement of the clamp members and the pans toward one another cease when the pads 74 and 79 of the respective clamp members are located at a level between the upper and lower beads of the strap 102. The relative positions of the uppermost pan and the clamp members may be assured by the contour of the cam 44 and by proper location of the switch or other device which controls operation of the elevator motor 20.

After the uppermost pan in a stack has been clamped between the clamp members, it must be lifted so as to clear remaining pans in the stack. Lifting of the clamped pan is effected by continued rotation of the cam 44 so as to effect rocking of the bell cranks 50 and 53 clockwise as viewed in FIGURE 1. After the clamped pan has been lifted clear of the remaining pans in the stack, it is transferred laterally so as to be deposited on the pan conveyor 4.

Pan transfer apparatus is designated generally by the reference character 105 and comprises a crank 106 having one of its ends keyed or otherwise suitably secured to the driven shaft 42, and having its other end pivoted to a link 107. The link 107 also is pivoted to one end of an operating bar 108 which slideably extends through an opening formed in an upstanding bracket 109 that is fixed to the carriage member 69. Preferably, the bracket 109 supports a pair of rollers 110 between which the operating bar 108 is received.

The operating bar extends through a block 111 that is supported by the carriage member 68. The bar 108 terminates in a reduced end portion 112 that extends through a bushing 113 which is supported by the block 111. A compression spring 114 reacts between the bushing and a washer 115 that is adjustably supported on the bar portion 112 by means of nuts 116. The spring 114 cooperates with the springs 85 and 88 in urging the carriage members 68 and 69 toward one another, and also permits overtravel of the operating bar 108 relative to the carriage member 68.

Interconnecting the carriage members 68 and 69 is an extensible and retractable snubbing device 118 of known construction comprising a pneumatic or hydraulic cylinder 119 that is supported on a bracket 120 which may be welded or otherwise suitably fixed to the block 111. Reciprocably mounted within the cylinder 119 is a piston (not shown) to which is connected one end of a piston rod 121. The opposite end of the piston rod 121 is threaded and passes through a plate 122 which is fixed to the carriage-mounted bracket 109. The piston rod is maintained in a selected position of adjustment relative to the carriage member 69 by means of lock nuts 123.

The capacity of the biasing springs 85 and 88 is such that they are capable of overcoming the resistance of the snubbing device 118 so as to be capable of effecting movement of the carriage members 68 and 69 toward one another. Because of the greater capacity of the biasing springs 85, movements imparted by the operating bar 108 to the carriage member 68 will be transmitted to the carriage member 69. However, the snubbing device 118 will act to brake or cushion the movement of the members 68 and 69 toward one another so as to avoid injuring the pans.

In the operation of the apparatus, the uppermost pan of a stack of pans will be gripped between the clamp members 73 and 78 in the manner previously described. Continued rotation of the cam shaft 42 and the cam 44 will elevate the uppermost pan to a position clear of the remaining pans in the stack, as is indicated in FIGURE 1. Continued rotation of the cam shaft 42 will cause the crank 106 and the link 107 to impart lateral movement to the operating bar 108 toward the left, as viewed in FIGURE 1, and such movement will effect corresponding movement of the carriage members 68 and 69 so as to transfer the elevated pan toward a position over the discharge conveyor 4 where the pan may be released.

Clamp releasing apparatus is best shown in FIGURES 3 and 4, and comprises a pair of stop blocks 125 and 126 supported on the carriage frame members 32 and 33, respectively, in such positions as to be clear of the path of the carriage rollers 80. Moreover, the flange or plate 81 of the carriage member 68 terminates short of the stops 125 and 126, as is shown in FIGURE 3, so as to permit the carriage member 68 to pass freely by the stop blocks. However, the plate or flange 82 on the carriage member 69 is of such length that its opposite ends may engage the stop blocks 125 and 126, as is shown in FIGURES 4 and 5.

Upon engagement of the carriage plate 82 with the stop blocks 125 and 126, further lateral movement of the carriage 69 toward the left, as is viewed in the drawings, is arrested. However, the throw of the crank 106 is such that lateral movement of the carriage 68 continues. Thus, the carriage members 68 and 69 move apart, and such movement effects separation of the clamp members 73 and 78.

Upon separation of the clamp members 73 and 78, the pan supported thereby will be released so as to be deposited by gravity upon the discharge conveyor 4. (See FIGURE 4.) As the pan is released, the latch release bar 101 also is released, thereby permitting the latch studs 99 to be received in one of the notches 95 formed in the adjacent latch bar 91. Thus the clamp releasing blocks or stops 125 also serve to effect recocking or repositioning of the unstacking apparatus for another cycle of operation.

After recocking of the pan unstacking apparatus, continued rotation of the cam shaft 42 will cause the operating bar 108 to be drawn to the right, as viewed in FIGURE 1, so as to reposition the apparatus over the stack of pans in condition for another cycle of operation.

The disclosed embodiment is representative of a presently preferred form of the invention, but is intended to be illustrative rather than definitive thereof. The invention is defined in the claims.

What is claimed is:

1. Apparatus for unstacking pans or the like having opposed walls, said apparatus comprising: means for supporting a stack of pans; a pair of clamp members mounted thereover; elevator means for moving the uppermost of said pans upwardly to the level of said clamp members; means mounting said members for relative movement toward and away from one another from and to a normal position in which said members are spaced from one another a distance to be free of engagement with said walls; biasing means acting on at least one of said members and urging the latter in a direction to effect engagement of said members with said walls; releasable latch means acting on said one of said members when said members are in said normal position and being operable to disable said biasing means and latch said members in said normal position; and latch releasing means operable in response to movement of the uppermost pan to said level to release said latch means and enable said biasing means to effect relative movement of said members in said direction.

2. Apparatus as set forth in claim 1 including means supporting said clamp members for vertical movements, and means connected to said supporting means for vertically moving the latter.

3. Apparatus as set forth in claim 1 including transfer means operatively connected to said clamp members and operable to transfer said clamp members laterally a distance at least as great as the spacing between said opposed walls of a pan.

4. Apparatus for unstacking pans or the like having opposed, spaced walls, said apparatus comprising: means for supporting a stack of pans; a pair of clamp members mounted above said means; elevator means for moving the uppermost of said pans upwardly to the level of said clamp members; means mounting said members for relative movement from and to a normal position in which said clamp members are spaced apart a distance different from the distance between said opposed walls; biasing means acting on at least one of said members and urging the latter to move relatively to the other of said members in a direction to effect engagement between said members and said walls; releasable latch means interconnecting said members and being operable to disable said biasing means; and means positioned at a level to be actuated by the said uppermost pan operatively connected with said latch means for releasing the latter.

5. Apparatus as set forth in claim 4 including means mounting said clamp members for vertical movements.

6. Apparatus as set forth in claim 4 wherein said mounting means supports said clamp members for both vertical and lateral movements, and including driving means connected to said mounting means for driving the latter vertically and laterally.

7. Apparatus for clamping a pan or the like having opposed walls, said apparatus comprising: means for supporting a stack of pans; clamp means including a pair of gripper members above said support means mounted for relative movements from a normal position toward and away from said walls; elevator means for moving the uppermost of said pans upwardly to the level of said clamp members; biasing means acting on at least one of said gripper members and urging the latter toward one of said walls; releasable latch means acting on said one of said members when said members are in said normal position and disabling said biasing means; and latch releasing means connected to said latch means and supported at a level to be engageable by the said uppermost pan when it reaches the level of said clamp members for releasing said latch means and enabling said biasing means to effect relative movement of said gripper members into clamping engagement with the walls of said pan.

8. Apparatus as set forth in claim 7 wherein said gripper members are biased by said biasing means for relative movement toward one another.

9. Apparatus as set forth in claim 7 including transfer means connected to said clamp means for shifting the latter laterally following the releasing of said latching means.

10. Apparatus for unstacking a stack of pans and delivering them individually to a discharge support including: support means for a stack of pans; discharge support means located a spaced distance laterally therefrom; transfer carriage means movable from a position above said pan stack support means to a position above said discharge support means; means moving said transfer carriage means to and from said positions; a pair of clamp members on said transfer carriage means mounted for relative movement to a pan clamping position and to a differently spread apart pan releasing position; means for relatively moving said pan stack support means and clamp members vertically to successively dispose the uppermost pan of said stack at the level of said clamp members; biasing means acting on at least one of said clamp members and normally urging the latter in a direction to effect relative movement of said clamp members to pan clamping engagement; and releasable clamp member securing means, in one position disabling said biasing means and in another position permitting said biasing means to act to effect said pan clamping engagement, operable in response to relative movement of the uppermost pan and clamp members to dispose the uppermost pan at the level of said clamp members to permit said biasing means to act to effect said pan clamping engagement, and to retain it until said transfer carriage has moved over to a position above said discharge support means.

11. Apparatus for unstacking a stack of pans and delivering them individually to a discharge support including: elevator means for a stack of pans; discharge support means located a spaced distance laterally therefrom; transfer carriage means movable from a position above said elevator means to a position above said discharge support means; means moving said transfer carriage means to and from said positions; a pair of clamp members on said transfer carriage means mounted for relative movement to a pan clamping position and to a differently spread apart pan releasing position; means for moving said elevator means upwardly in increments to successively deliver the uppermost pan of said stack to the level of said clamp members; biasing means acting on at least one of said clamp members and normally urging the latter in a direction to effect relative movement of said clamp members to pan clamping engagement; and releasable clamp member securing means in one position disabling said biasing means and in another position permitting said biasing means to act to effect said pan clamping engagement operative at a time when the uppermost pan has been moved to the level of said clamp members by said elevator means to permit said biasing means to act to effect said pan clamping engagement, and to retain it until said transfer carriage has moved over to a position above said discharge support means.

12. Apparatus for unstacking a stack of pans and delivering them individually to a discharge support including: support means for a stack of pans; discharge support means located a spaced distance laterally therefrom; transfer carriage means movable from a position above said pan stack support means to a position above said discharge support means; means moving said transfer carriage means to and from said positions; a pair of clamp members on said transfer carriage means mounted for relative movement to a pan clamping position and to a differently spread apart pan releasing position; means for relatively moving said pan stack support means and clamp members vertically to successively dispose the uppermost pan of said stack at the level of said clamp members; biasing means acting on at least one of said members and normally urging the latter in a direction to effect relative movement of said clamp members to pan clamping engagement; and releasable clamp member securing means carried by said transfer carriage means in one position disabling said biasing means and in another position permitting said biasing means to act to effect said pan clamping engagement operative at a time when the uppermost pan is at the level of said clamp members to permit said biasing means to act to effect said pan clamping engagement, and to retain it until said transfer carriage has moved over to a position above said discharge support means.

13. Apparatus for unstacking a stack of pans and delivering them individually to a discharge conveyor including: elevator means for a nested stack of pans for moving the stack upward incrementally one pan height at a time; discharge conveyor means located a spaced distance laterally therefrom; track frame means; transfer carriage means supported thereon for lateral travel and movable from a position above said support means to a position above said discharge conveyor means; means moving said transfer carriage means to and from said positions; a pair of reciprocable clamp members on said transfer carriage means mounted for relative movement to a pan clamping position and a spread apart pan releasing position; means for moving said track frame means upwardly following movement of said clamp members to pan clamping position and downwardly following movement of said clamp members to pan releasing position and return of said transfer carriage means to position said clamp members over said elevator means; biasing means acting on at least one of said members and normally urging the latter in a direction to effect relative movement of said clamp members to pan clamping engagement; clamp member securing means in one position disabling said biasing means and in another position permitting said biasing means to act to effect said pan clamping engagement; and release means operable by the uppermost pan in response to its movement to the level of said clamp members to permit said biasing means to act to effect said pan clamping engagement, and to retain it until said transfer carriage has moved over to a position above said discharge conveyor means.

14. Apparatus for unstacking a stack of pans and delivering them individually to a discharge conveyor including: support means for a stack of nested pans; discharge conveyor means located a spaced distance laterally therefrom; vertically movable frame means; transfer carriage means movable thereon from a position above said support means to a position above said discharge conveyor means; rotatable drive means; rotatable cam means associated therewith; linkage means in engagement with said cam means suspending said frame means in a manner such that the throw of said cam means raises said frame means and the forces of gravity lower said frame means and maintain said linkage means in engagement with said cam means; means moving said transfer carriage means to and from said positions; a pair of clamp members on said transfer carriage means mounted for relative movement to a pan clamping position and to a differently spread apart pan releasing position; means acting on at least one of said members and normally urging the latter in a direction to effect relative movement of said clamp members to pan clamping engagement; and means acting on said clamp members to restore said clamp members to pan releasing engagement after movement of said frame means upwardly and said transfer carriage means laterally to a position over said discharge conveyor means.

15. The combination defined in claim 14 in which said biasing means comprises a spring connecting said clamp members, and said disabling means comprises a latch bar connected to one of said clamp members but not to the other; and having notch means in the upper surface thereof; and a detent mounted on the other clamp member to engage by gravity in said notch means.

16. Apparatus for unstacking pans or the like having opposed walls, said apparatus comprising: a pair of clamp members; means mounting said members for relative movement toward and away from one another from and to a normal position in which said members are spaced from one another a distance to be free of engagement with said walls; biasing means acting on at least one of said members and urging the latter in a direction to effect engagement between said members and said walls; releasable latch means acting on said one of said members when said members are in said normal position and being operable to disable said biasing means and latch said members in said normal position; latch releasing means operatively connected to said latch to release said latch means and enable said biasing means to effect relative movement of said members in said direction; and cocking means positioned to engage one of said clamp members in response to transfer of said members and cooperable with said transfer means to restore said clamp members to said normal position and effect disengagement between said clamp members and the walls of said pan.

17. Apparatus for unstacking pans or the like having opposed, spaced walls, said apparatus comprising: a pair of clamp members; means mounting said members for relative movements from and to a normal position in which said clamp members are spaced apart a distance different from the distance between said opposed walls; biasing means acting on at least one of said members and urging the latter to move relatively to the other of said members in a direction to effect engagement between said members and said walls; releasable latch means interconnecting said members and being operable to disable said biasing means; means operatively connected with said latch means for releasing the latter; mounting means supporting said clamp members for lateral movements; and stop means located in the path of lateral movement of one of said clamp members and operable to interrupt movement of the latter while lateral movement of the other clamp member continues.

18. Apparatus for clamping a pan or the like having opposed walls, said apparatus comprising: clamp means including a pair of gripper members mounted for relative movements from a normal position toward and away from said walls; biasing means acting on at least one of said gripper members and urging the latter toward one of said walls; releasable latch means acting on said one of said members when said members are in said normal position and disabling said biasing means; pan supporting means; means for effecting relative movement between said supporting members and said gripper members; latch releasing means connected to said latch means engageable by a pan supported by said supporting means for releasing said latch means and enabling said biasing means to effect relative movement of said gripper members into clamping engagement with the walls of said pan; transfer means connected to said clamp means for shifting the latter laterally following the releasing of said latching means; and stop means located in the path of lateral movement of one of said gripper members for interrupting such movement thereof while lateral movement of the other of said members continues, thereby restoring said gripper members to said normal position.

19. Apparatus for unstacking pans from a stack thereof, said apparatus comprising first supporting means for supporting a stack of pans, each of which has opposed walls; clamp means including a pair of spaced apart gripper members; second supporting means supporting said clamp means above said stack; biasing means acting on said gripper members and urging them to move in such directions from a normal position as to engage opposed walls of the uppermost pan in said stack; releasable latch means interconnecting said gripper members and disabling said biasing means; means connected to one of said first and second supporting means for effecting relative movement of said clamp means and said stack toward one another; latch releasing means connected to said latch means and engageable with the uppermost pan in said stack for releasing said latch means and enabling said biasing means to move said gripper members from said normal position into clamping engagement with opposed walls of the uppermost pan; means for effecting relative movement of said first and second supporting means away from one another to remove the uppermost pan from said stack; means connected to said clamp means for moving the latter laterally when the uppermost pan has been removed from said stack; and stop means located in the path of lateral movement of one of said gripper members for interrupting its lateral movement while the other gripper member continues its lateral movement, thereby effecting relative movement of said gripper members in a direction to release the pan clamped therebetween.

References Cited by the Examiner

UNITED STATES PATENTS

| | | | |
|---|---|---|---|
| 911,167 | 2/09 | Shroder et al. | 294—110 |
| 2,702,132 | 2/55 | Van Doran | 221—225 |
| 2,980,265 | 4/61 | Johnson et al. | 214—8.5 |
| 3,050,199 | 8/62 | McGrath et al. | 214—8.5 |

FOREIGN PATENTS 154,224 12/20 Great Britain.

RAPHAEL M. LUPO, *Primary Examiner.*

LOUIS J. DEMBO, *Examiner.*